UNITED STATES PATENT OFFICE.

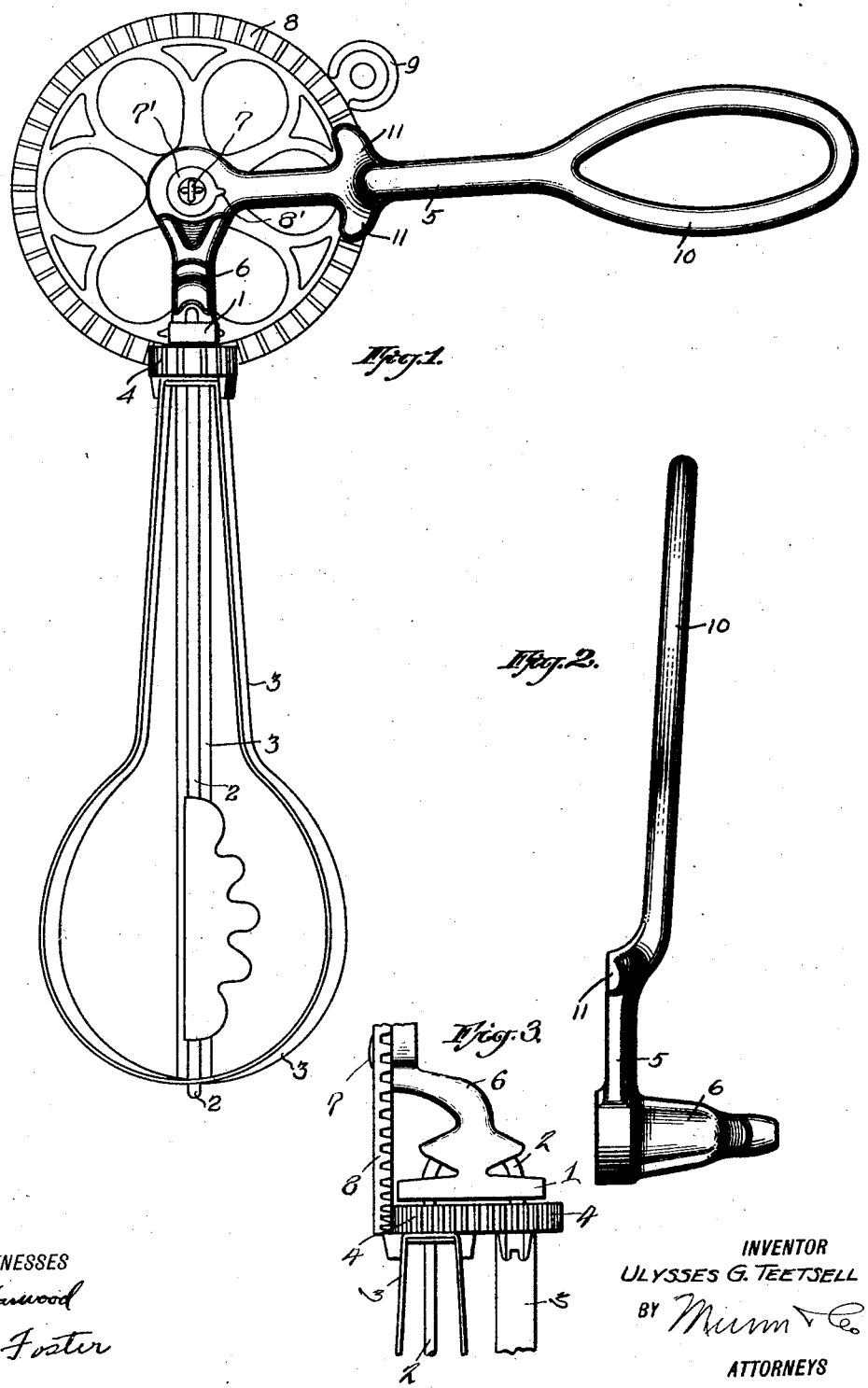

ULYSSES GRANT TEETSELL, OF TARRYTOWN, NEW YORK.

EGG BEATER.

1,406,778. Specification of Letters Patent. Patented Feb. 14, 1922.

Application filed April 29, 1921. Serial No. 465,424.

*To all whom it may concern:*

Be it known that I, ULYSSES GRANT TEETSELL, a citizen of the United States, and a resident of Tarrytown, in the county of Westchester and State of New York, have invented a new and Improved Egg Beater, of which the following is a full, clear, and exact description.

This invention relates to improvements in egg beaters, the primary object of the invention being to provide a novel form of handle for the beater. It is customary in all devices of this character in which one or more dashers are mounted in a vertical frame to have a handle member located in substantially vertical alignment with the dasher frame. The inconvenience and disadvantages of this type of beater have long been manifest. Among the most noticeable of these disadvantages are the tendency of the beater to slide around in the bowl where it is being used, due to a lack of proper leverage to hold it steady, and the fact that while the operator holding the beater often scratches his knuckles on the gear wheel which is commonly used to actuate the dashers. Still another disadvantage is the fact that the operator, particularly when stirring a small quantity of material, is unable to see just when the material has been stirred sufficiently because the hand which holds the beater interferes with a view of the material which is being stirred or beaten.

An object of this invention therefore, is to overcome all of these difficulties by providing a novel form of handle member.

Another object is to provide a beater which will be simple and practical in construction, strong, durable and efficient in use, neat and attractive in appearance, and comparatively inexpensive to manufacture.

With these and other objects in view, the invention consists of certain novel features of construction and combinations and arrangements of parts as will be more fully hereinafter described and pointed out in the claims.

In the accompanying drawings:—

Figure 1 is a view in side elevation of my improved beater; and

Figure 2 is a top plan view of the handle member.

Figure 3 is a fragmentary edge view of Figure 1.

Referring in detail to the drawings, 1 represents a cross head, from which depends the usual paddle or dasher frame 2. Rotary dashers 3 are mounted in the frame and are fixed to turn with intermeshing gear wheels 4 located around the frame members 2 directly below the cross head.

5 represents the handle of the beater which is secured upon the cross head. This handle member includes a laterally offset portion 6, in one end of which, a shaft or pin 7 is fixed, the portion 6 having an opening receiving the pin which is headed at one end as shown in Fig. 3 and the other end engaged by a washer 7' seated in a recess or depression around the opening and against which the adjacent end of the pin is upset to retain the washer in position. The washer is provided with a projection or lug 8' at the periphery engaging a notch in the portion 6 at the opening so as to prevent the pin from turning, although the pin may be enlarged or headed and so shaped, or otherwise formed or provided as to fix the same to the casting of the handle and portion 6, or otherwise mounted to rotatably support the crown gear 8. This shaft provides a partial bearing for the customary crown gear 8 which meshes with one of the gear wheels 4. The usual crank 9 is provided for manually operating the crown gear.

Contrary to the usual custom, the handle member 6 is offset at right angles to the vertical plane of the dasher frame and terminates in a loop 10. Integral lugs or extensions 11 on the handle member protect the thumb of the user from contact with the crown gear.

The fact that the handle is thus offset gives the desired leverage so that the lower end of the frame can be held steady in the bottom of a bowl and will not slip and slide. The thumb guard prevents injury to the hands of the operator who is able at all times to see the condition of the liquid which is being beaten.

Although I have illustrated one of the preferred embodiments of my invention, it will be apparent that various slight changes and alterations might be made in the general form and arrangement of the parts described without departing from the invention and hence I do not wish to limit myself to the precise details set forth, but shall consider myself at liberty to make such slight changes and alterations as fairly fall within the spirit and scope of the appended claims.

I claim:

1. An egg beater, including an angular frame, a cross head at the lower end of the frame, dashers, intermeshing gear wheels mounted below the cross head and operatively connected to the dashers, a handle member located at right angles to the plane of the angular frame and integral therewith, and a crown gear rotatably mounted at the junction of the handle and frame meshing with one of the gear wheels.

2. An egg beater, including an angular frame, a cross head at the lower end of the frame, dashers, intermeshing gear wheels mounted below the cross head and operatively connected to the dashers, a handle member located at right angles to the plane of the angular frame and integral therewith, and a worm gear rotatably mounted at the junction of the handle and frame meshing with one of the gear wheels, said handle member terminating in a looped palm grip, and integral thumb guards on the handle protecting the thumbs of the user from contact with the crown gear.

ULYSSES GRANT TEETSELL.